3,385,668
PREPARATION OF CARBON MONOXIDE BY REACTION OF CARBON DIOXIDE WITH FINELY DIVIDED CARBON IN A FUSED SALT BATH CONTAINING A DISSOLVED CATALYST

Calvin A. Schunemann, Gates Mills, Ohio, assignor to Horizons Incorporated, a corporation of New Jersey
No Drawing. Filed Nov. 22, 1966, Ser. No. 596,055
4 Claims. (Cl. 23—204)

ABSTRACT OF THE DISCLOSURE

The preparation of carbon monoxide by reaction of carbon dioxide with finely divided carbon. The reaction is carried out in a fused salt bath in which a catalyst for the reacton is dissolved.

---

This invention relates to the preparation of carbon monoxide by reaction of carbon dioxide with finely divided carbon in a fused salt environment and in the presence of a catalyst dissolved in said fused salt.

In many chemical processes carbon monoxide is utilized as a reducing agent and is thereby oxidized to carbon dioxide. From the standpoint of economics, it is often desirable to convert the carbon dioxide to carbon monoxide for reuse in the chemical process.

One object of the present invention is to provide an efficient and economical preparation of carbon monoxide from carbon dioxide.

Briefly, the present process involves the following:

(1) preheating of a gas which consists principally of $CO_2$;

(2) providing a fused salt bath in which finely divided carbon is distributed throughout the bath;

(3) introducing the preheated gas into the fused salt bath containing finely divided solid carbon particles;

(4) dissolving a catalyst in said fused salt bath in order to maintain said particles dispersed throughout said salt bath and to obtain reaction rates which are of practical importance for other reaction in which CO is formed; and (5) recovering the resulting carbon monoxide as it is evolved from the fused salt bath.

The process of this invention can be operated as a batch process in which a single charge of carbon particles is utilized in a fused salt melt or it may be run as a continuous process by intermittently or continuously replenishing the carbon particle content of the fused salt bath. The invention will be more completely understood by reference to the following data illustrating the carrying out of this invention on a small scale.

A stainless steel tank 4" wide, 8" long, 10" deep was filled to a depth of approximately 8" with sodium chloride. The tank and its contents were heated to melt the salt. The tank and is contents were covered with a roof on which were mounted a drive motor and a 3 inch, three bladed marine type propeller shaped stirred. The shaft of the stirrer was hollow so that a gas could be introduced into the salt under the blades of the stirrer. The stirrer rotated so that the motion of the salt was downward under the blades of the propeller and up along the two end sides of the tank. Ports were provided in the roof for viewing the action of the surface of the salt.

Experiments were made to determine the yield of carbon monoxide produced when carbon dioxide is sparged into the molten sodium chloride bath maintained at a temperature of approximately 1800° F. and containing free carbon in the form of crushed petroleum coke of approximately −30 mesh in amounts up to 10% by weight. The carbon dioxide was sparged into the molten salt and carbon mixture at rates ranging from .2 to 2.0 liters per minute. The impeller speed was maintained at approximately 450 r.p.m.

This series of tests was run utilizing carbon either as a blanket covering the melt or as a reactant mixed into the salt.

TABLE I

| Run | Bath Carbon | $CO_2$ in Flow Rate, Liter/Min. | Salt Temp., °F. | $CO_2$ in Exit Gas (Percent) | Remarks |
|---|---|---|---|---|---|
| 1 | Covered with 10 mesh charcoal | 1.0 | 1,900 | 32.4 | |
| 2 | do | .5 | 1,900 | 25.0 | |
| 3 | do | .25 | 1,900 | 14.0 | |
| 4 | Charcoal cover plus 5% petroleum coke in bath | 1.0 | 1,900 | 14.0 | Coarse petroleum coke. |
| 5 | No charcoal cover plus 10% petroleum coke in bath | 1.0 | 1,800 | 52.1 | Salt depth 5". |
| 6 | No cover, 10% petroleum coke in bath | 1.0 | 1,800 | 38.1 | Salt depth 8". |
| 7 | do | .5 | 1,800 | 27.9 | |
| 8 | do | 1.0 | 1,800 | 40.6 | Duplicate of run 6. |
| 9 | Charcoal cover plus 10% petroleum coke in bath | 1.0 | 1,800 | 18.2 | Added ½" minus 10 mesh charcoal cover. |
| 10 | do | .5 | 1,800 | 9.9 | |
| 11 | 10% Wt. petroleum coke (fine) | 1.0 | 1,850 | 19.3 | |
| 12 | 8% Wt. petroleum coke in bath | [1] 1.0 | 1,850 | Nil | Nitrogen sparge, added 10% minus 30 mesh petroleum coke. |
| 13 | do | .5 | 1,850 | 2.1 | |
| 14 | do | .5 | 1,850 | 2.0 | |
| 15 | do | 1.1 | 1,850 | 2.6 | |
| 16 | 2% in Bath, remainder on surface | 1.1 | 1,850 | 2.8 | |
| 17 | 1% in Bath, remainder on surface | 2.0 | 1,850 | 11.4 | |
| 18 | 8% Petroleum coke in bath | 1.0 | 1,850 | .6 | Added .22% $Na_2CO_3$. |
| 19 | do | 2.0 | 1,850 | .4 | |
| 20 | 15% Petroleum coke in bath | 2.0 | 1,850 | .8 | Leak reduced salt level to 4". |
| 21 | 12% Petroleum coke in bath | .25 | 1,850 | | Addition to make .83% $Na_2CO_3$. |
| 22 | do | 1.0 | 1,850 | 2.6 | |
| 23 | do | 1.0 | 1,850 | 2.2 | |
| 24 | do | 2.0 | 1,850 | 2.4 | |
| 25 | 10% Petroleum Coke in Bath | 1.0 | 1,850 | 1.6 | Added 1% $Na_2CO_3$ |
| 26 | do | 1.0 | 1,850 | 1.1 | Added 1% $Na_2CO_3$ |
| 27 | do | 1.0 | 1,850 | Nil | $Na_2CO_3$ .9% after addition. |
| 28 | 11% Petroleum Coke in Bath | 1.0 | 1,850 | .8 | $Na_2CO_3$ .7% |
| 29 | 12.8% Petroleum Coke in Bath | 1.0 | 1,850 | .6 | $Na_2CO_3$ .9% |
| 30 | do | 1.0 | 1,850 | .7 | |
| 31 | 7% Petroleum Coke in Bath | .5 | 1,850 | .8 | Sparger is partly clogged with deposit. |
| 32 | 8% Petroleum Coke in Bath | .5 | 1,850 | .4 | |

[1] $N_2$.

In runs 1 through 11 and 21 through 24, the $CO_2$ gas feed was introduced into the bath through the hollow impeller without any preheating. In the remaining runs, the gas was preheated to approximately 1800° F. before being introduced into the bath.

In runs 1 through 17, the salt in the melt consisted entirely of sodium chloride, and in runs 18 through 32, a small amount of sodium carbonate was present in the melt.

From the results obtained, it is readily apparent that in order to obtain a satisfactory conversion of $CO_2$ to CO, it is necessary to preheat the $CO_2$ gas and to provide a sufficient residence time in the melt for the gas. It will also be seen that by the use of a small, but effective, amount of sodium carbonate the reaction is pushed still further toward completion.

While not wishing to be bound by any specific theory, it is believed that the carbon dioxide plus carbon reaction is catalyzed by the presence of sodium carbonate dissolved in the melt and behaving chemically, perhaps in the manner proposed in an article in Industrial and Engineering Chemistry, vol. 23 p. 250 et seq. (1931) or in Johnson et al. United States Patent 2,921,840. The effectiveness of the catalysts is much greater when the carbonate is in solution.

Whatever the explanation, the operating conditions preferred in the practice of this invention are as follows:
(1) Salt temperature 1800–1900° F.
(2) Feed gas temperature 1500–1800° F.
(3) Carbonate content of bath 0.25 to 2% by weight dissolved in the salt bath.
(4) Between 5% and 15% by weight of finely divided carbon dispersed throughout salt bath.
(5) Preferably, but optionally, the melt is covered by a layer of charcoal particles, between about ½" and 1" in depth.

It is to be particularly noted that the carbon monoxide which is obtained contains much lower amounts of carbon dioxide than carbon monoxide produced by many other known processes, contents of less than 1% $CO_2$ being readily obtainable by the process of this invention.

Having now described the invention it is not intended that it be limited except as may be required by the appended claims.

1. In a process for converting the $CO_2$ content of a gas consisting principally of $CO_2$ into CO which comprises reacting said gas with finely divided carbon, the improvements which comprise
    carrying out the reaction in a fused salt melt containing dispersed finely divided carbon and a catalyst dissolved in said melt;
    preheating the $CO_2$ containing gas;
    introducing the preheated gas into the melt below the surface of said melt, in order to provide a sufficient residence time for said gas in said melt, for said gas to react with finely divided carbon particles dispersed in said melt; and
    recovering the carbon monoxide so produced.

2. The process of claim 1 wherein the catalyst is an alkali metal carbonate.

3. The process of claim 1 wherein the $CO_2$ containing gas is preheated to about 1800° F.

4. The process of claim 1 wherein the salt bath is mechanically agitated during the process.

References Cited

UNITED STATES PATENTS

| | | |
|---|---|---|
| 1,163,922 | 12/1915 | Hillhouse. |
| 1,592,860 | 7/1926 | Leonarz. |

FOREIGN PATENTS

| | | |
|---|---|---|
| 573,355 | 3/1959 | Canada. |
| 733,111 | 7/1955 | Great Britain. |

OSCAR R. VERTIZ, *Primary Examiner.*

H. M. S. MILLER, *Assistant Examiner.*